United States Patent
Singal et al.

(10) Patent No.: US 11,902,089 B2
(45) Date of Patent: Feb. 13, 2024

(54) AUTOMATED NETWORKING DEVICE REPLACEMENT SYSTEM

(71) Applicant: Dell Products L.P., Round Rock, TX (US)

(72) Inventors: Pawan Kumar Singal, Milpitas, CA (US); Balaji Rajagopalan, Sunnyvale, CA (US); Sudhir Vittal Shetty, Cedar Park, TX (US); Zoheb Khan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 17/126,325

(22) Filed: Dec. 18, 2020

(65) Prior Publication Data

US 2022/0200849 A1    Jun. 23, 2022

(51) Int. Cl.

| H04L 41/08 | (2022.01) |
|---|---|
| H04L 41/0806 | (2022.01) |
| H04L 41/0668 | (2022.01) |
| H04L 41/0604 | (2022.01) |
| H04L 41/082 | (2022.01) |

(52) U.S. Cl.
CPC ...... *H04L 41/0806* (2013.01); *H04L 41/0627* (2013.01); *H04L 41/0668* (2013.01); *H04L 41/082* (2013.01); *H04L 41/0886* (2013.01)

(58) Field of Classification Search
CPC . H04L 41/0806; H04L 41/08; H04L 41/0695; H04L 41/0627; H04L 41/5035; H04L 41/0668; H04L 41/082; H04L 41/0803; H04L 41/0886; H04L 41/0846; H04L 41/12
See application file for complete search history.

(56) References Cited

U.S. PATENT DOCUMENTS

| 8,677,342 B1 * | 3/2014 | Kidder | H04L 41/0806 709/224 |
| 9,626,177 B1 * | 4/2017 | Madduri | G06F 21/57 |
| 10,560,550 B1 * | 2/2020 | Xue | H04L 41/0846 |
| 11,636,015 B2 * | 4/2023 | Agetsuma | G06F 11/2094 714/6.3 |

(Continued)

*Primary Examiner* — Hitesh Patel
*Assistant Examiner* — Vinh Nguyen
(74) *Attorney, Agent, or Firm* — Joseph Mencher

(57) ABSTRACT

An automated networking device replacement system includes a chassis housing in which management module and a fabric services subsystem are provided. The fabric services subsystem identifies that a first networking device has been provided in the chassis, and determines that the first networking device is a replacement for a second networking device. In response, the fabric services subsystem automatically identifies at least one fabric-services-based configuration that was performed on the second networking device, and automatically performs the at least one fabric-services-based configuration on the first networking device. The fabric services subsystem then transmits a management-module-based configuration instruction to the management module that causes the management module to automatically perform at least one management-module-based configuration on the first networking device that was performed on the second networking device.

20 Claims, 9 Drawing Sheets

(56) References Cited

U.S. PATENT DOCUMENTS

| | | | |
|---|---|---|---|
| 2002/0188711 A1* | 12/2002 | Meyer | G06F 3/0632 709/223 |
| 2003/0023895 A1* | 1/2003 | Sinha | G06F 11/2017 714/5.11 |
| 2004/0236987 A1* | 11/2004 | Greenspan | H04L 67/1095 714/E11.073 |
| 2006/0159007 A1* | 7/2006 | Frutiger | H04L 41/0869 370/216 |
| 2008/0163336 A1* | 7/2008 | Feng | G06F 21/10 726/1 |
| 2008/0172571 A1* | 7/2008 | Andrews | G06F 11/1092 714/6.12 |
| 2008/0294933 A1* | 11/2008 | Nishii | G06F 11/2025 714/5.11 |
| 2009/0100155 A1* | 4/2009 | Lee | H04L 67/125 709/220 |
| 2009/0158081 A1* | 6/2009 | Dake | G06F 11/2028 714/E11.023 |
| 2010/0162383 A1* | 6/2010 | Linden | G06F 15/177 726/13 |
| 2010/0272057 A1* | 10/2010 | Chen | H04L 69/08 370/329 |
| 2013/0188521 A1* | 7/2013 | Jain | H04L 12/185 370/255 |
| 2014/0006676 A1* | 1/2014 | Chandrasekhar | G06F 13/4022 710/316 |
| 2014/0229590 A1* | 8/2014 | Bennah | G06F 11/2025 709/221 |
| 2015/0026323 A1* | 1/2015 | Peri | H04L 67/26 709/223 |
| 2015/0160935 A1* | 6/2015 | Nye | H04L 67/34 717/178 |
| 2015/0249512 A1* | 9/2015 | Adimatyam | H04N 21/6106 725/107 |
| 2015/0312087 A1* | 10/2015 | Terwilliger | G06F 11/0706 455/41.1 |
| 2016/0182407 A1* | 6/2016 | McCaughan | H04L 41/0672 370/219 |
| 2017/0033981 A1* | 2/2017 | Ruble | H04L 41/0846 |
| 2017/0214571 A1* | 7/2017 | Johnsen | H04L 45/02 |
| 2018/0113426 A1* | 4/2018 | Tang | G05B 19/042 |
| 2018/0241846 A1* | 8/2018 | Narayanan | H04L 41/0883 |
| 2018/0262722 A1* | 9/2018 | Li | H04L 41/0889 |
| 2018/0351793 A1* | 12/2018 | Hunter | H04L 41/0836 |
| 2018/0365064 A1* | 12/2018 | Gakhar | G06F 9/5083 |
| 2019/0007263 A1* | 1/2019 | Lahiri | G06F 11/2257 |
| 2020/0036713 A1* | 1/2020 | Kinomoto | H04L 41/0869 |
| 2020/0076807 A1* | 3/2020 | Driever | H04L 9/085 |
| 2021/0036918 A1* | 2/2021 | Singla | H04W 12/009 |
| 2021/0349796 A1* | 11/2021 | Mutnuru | G06F 11/3034 |

* cited by examiner

AUTOMATED NETWORKING DEVICE REPLACEMENT SYSTEM

BACKGROUND

The present disclosure relates generally to information handling systems, and more particularly to automating the replacement of networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, Input/Output Modules (IOMs) operating as full switch devices or fabric switch devices, as well as other networking devices known in the art, may operate to provide a networking fabric, and sometimes become unavailable and require replacement. In such situations, conventional networking device replacement systems require a network administrator or other user to physically replace the unavailable networking device with a replacement network device (e.g., by de-cabling and removing the unavailable networking device from the slot in the chassis in which it is located, and then cabling and positioning the replacement networking device in that slot in the chassis), identify the various configurations that were being utilized by the unavailable networking device and other networking components in the networking fabric that were connected to that unavailable networking device, determine the location of those configurations, retrieve those configurations, and apply those configurations on the replacement networking device and the other networking components in the networking fabric connected to the replacement networking device so that the replacement networking device and the networking fabric may operate in the same manner as the unavailable networking device/networking fabric. As such, conventional networking device replacement operations are a manual, time-consuming process that is subject to errors Accordingly, it would be desirable to provide a networking device replacement system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a fabric services engine is configured to: identify that a first networking device has been provided in a chassis; determine that the first networking device is a replacement for a second networking device; automatically identify, in response to determining that the first networking device is a replacement for the second networking device, at least one fabric-services-based configuration that was performed on the second networking device; automatically perform, in response to identifying the at least one fabric-services-based configuration, the at least one fabric-services-based configuration on the first networking device; and transmit a management-module-based configuration instruction to a management module that is configured to cause the management module to automatically perform at least one management-module-based configuration on the first networking device that was performed on the second networking device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
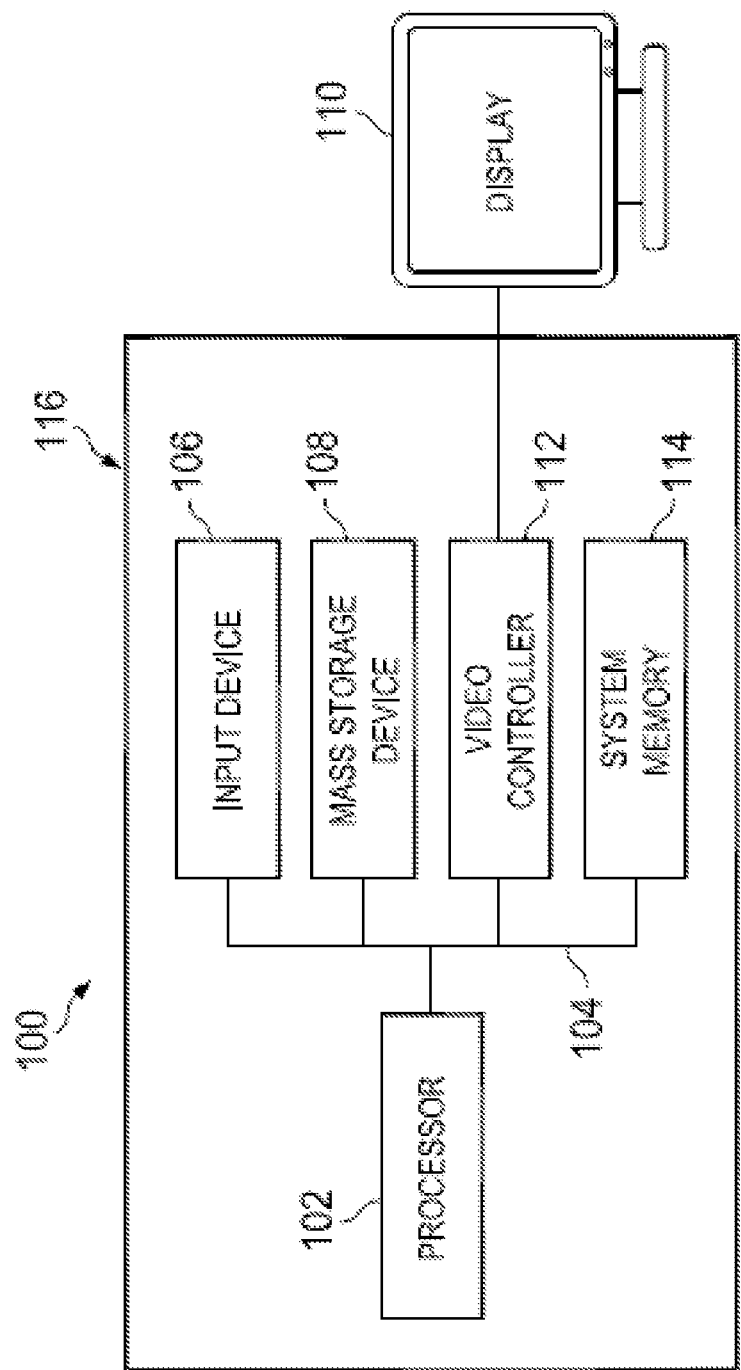
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
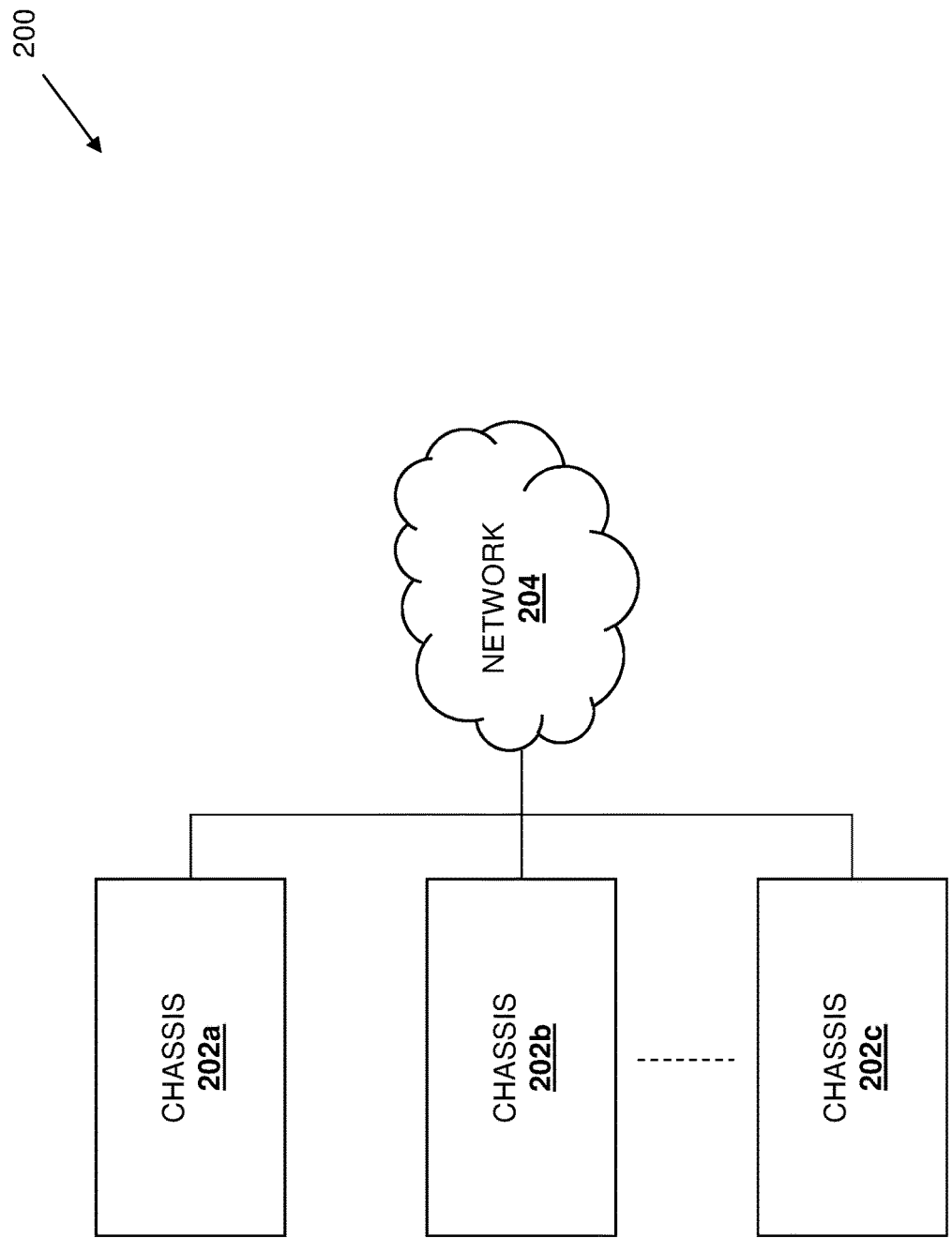
FIG. 2 is a schematic view illustrating an embodiment of a networked system.

Referring now to FIG. 2, an embodiment of a networked system 200 is illustrated. In the illustrated embodiment, the networked system 200 includes a plurality of chassis 202a, 202b, and up to 202c, each of which is coupled to a network 204 that may be provided by a Local Area Network (LAN), the Internet, combinations thereof, and/or any other networks that would be apparent to one of skill in the art in possession of the present disclosure. In an embodiment, any or all of the chassis 202a-202c may house one or more of the IHS 100 discussed above with reference to FIG. 1, and/or may include some or all of the components of the IHS 100, and in specific examples may be provided by a POWEREDGE® MX7000 Modular Chassis available from DELL® Inc. of Round Rock, Texas, United States. As such, any of the chassis 202a-202c may house compute devices (e.g., server devices), storage devices, networking devices (e.g., Input/Output Modules (IOMs) and/or other networking devices known in the art), management devices (e.g., the management modules discussed below, Baseboard Management Controller (BMC) devices, and/or other management devices known in the art), and/or any other chassis devices that would be apparent to one of skill in the art in possession of the present disclosure. However, while illustrated and discussed as being provided by chassis housing specific devices, one of skill in the art in possession of the present disclosure will recognize that chassis provided in the networked system 200 may include any devices that may be configured to operate similarly as the devices in the chassis discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
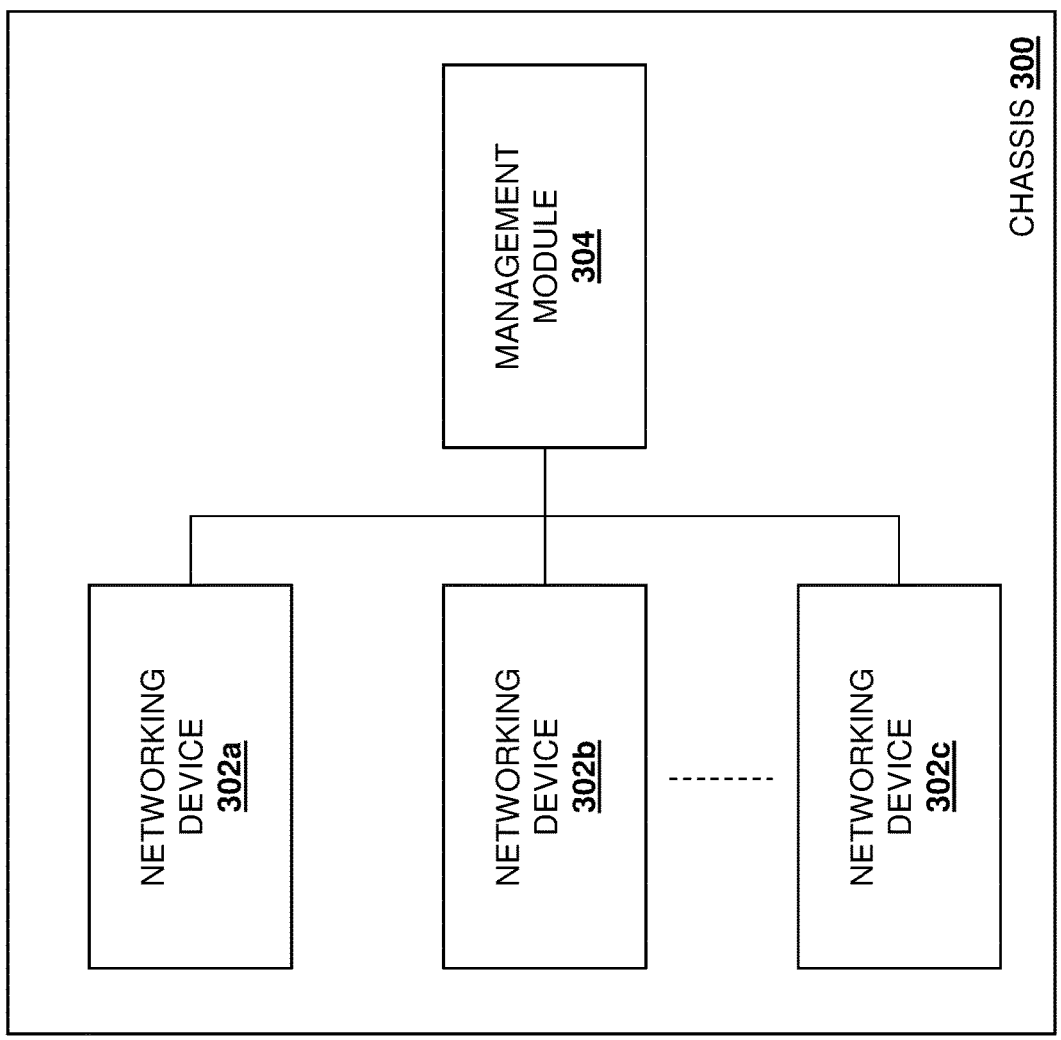
FIG. 3 is a schematic view illustrating an embodiment of a chassis that may be included in the networked system of FIG. 2.

Referring now to FIG. 3, an embodiment of a chassis 300 is illustrated that may provide any or all of the chassis 202a-202c discussed above with reference to FIG. 2. As such, the chassis 300 may house one or more of the IHS 100 discussed above with reference to FIG. 1 and/or may include some or all of the components of the IHS 100, and in specific examples may be provided by a POWEREDGE® MX7000 Modular Chassis available from DELL® Inc. of Round Rock, Texas, United States. Furthermore, while illustrated and discussed as a chassis housing specific devices, one of skill in the art in possession of the present disclosure will recognize that the functionality of the devices in the chassis 300 discussed below may be provided by other devices that are configured to operate similarly as devices in the chassis 300 discussed below. In the illustrated embodiment, the chassis 300 houses a plurality of networking devices 302a, 302b, and up to 302c, each of which may be coupled to the network 204 discussed above with reference to FIG. 2. In an embodiment, any or all of the networking devices 302a-302c may be provided the IHS 100 discussed above with reference to FIG. 1 and/or may include some or all of the components of the IHS 100, and in the specific examples discussed below are provided by IOMs that are configured to operate in a "full switch" role or in a "fabric switch" role. However, while described as IOMs that are configured to operate in a "full switch" role or in a "fabric switch" role, one of skill in the art in possession of the present disclosure will appreciate that other networking devices will fall within the scope of the present disclosure as well.

In the illustrated embodiment, the chassis 300 also houses a management module 304 that is coupled to each of networking devices 302a-302c, and that may be coupled to the network 204 discussed above with reference to FIG. 2 (e.g., via a dedicated management network connection, via one or more of the networking devices 302a-302c, etc.). In an embodiment, the management module 304 may be provided the IHS 100 discussed above with reference to FIG. 1 and/or may include some or all of the components of the IHS 100, and in specific examples below is described as being provided by an OpenManage Enterprise Modular (OME-M) management module. However, while illustrated and described as being provided by a particular management module, one of skill in the art in possession of the present disclosure will appreciate that the management module 304 may be provided by other management devices/subsystems while remaining within the scope of the present disclosure as well. Furthermore, while a specific chassis 300 has been illustrated and described, one of skill in the art in possession of the present disclosure will recognize that chassis in the automated networking device replacement system of the present disclosure may house a variety of other devices (e.g., computing devices such as server devices, storage devices, etc.) for providing conventional functionality, as well as the networking device replacement functionality discussed below, while remaining within the scope of the present disclosure as well.

Figure 4:
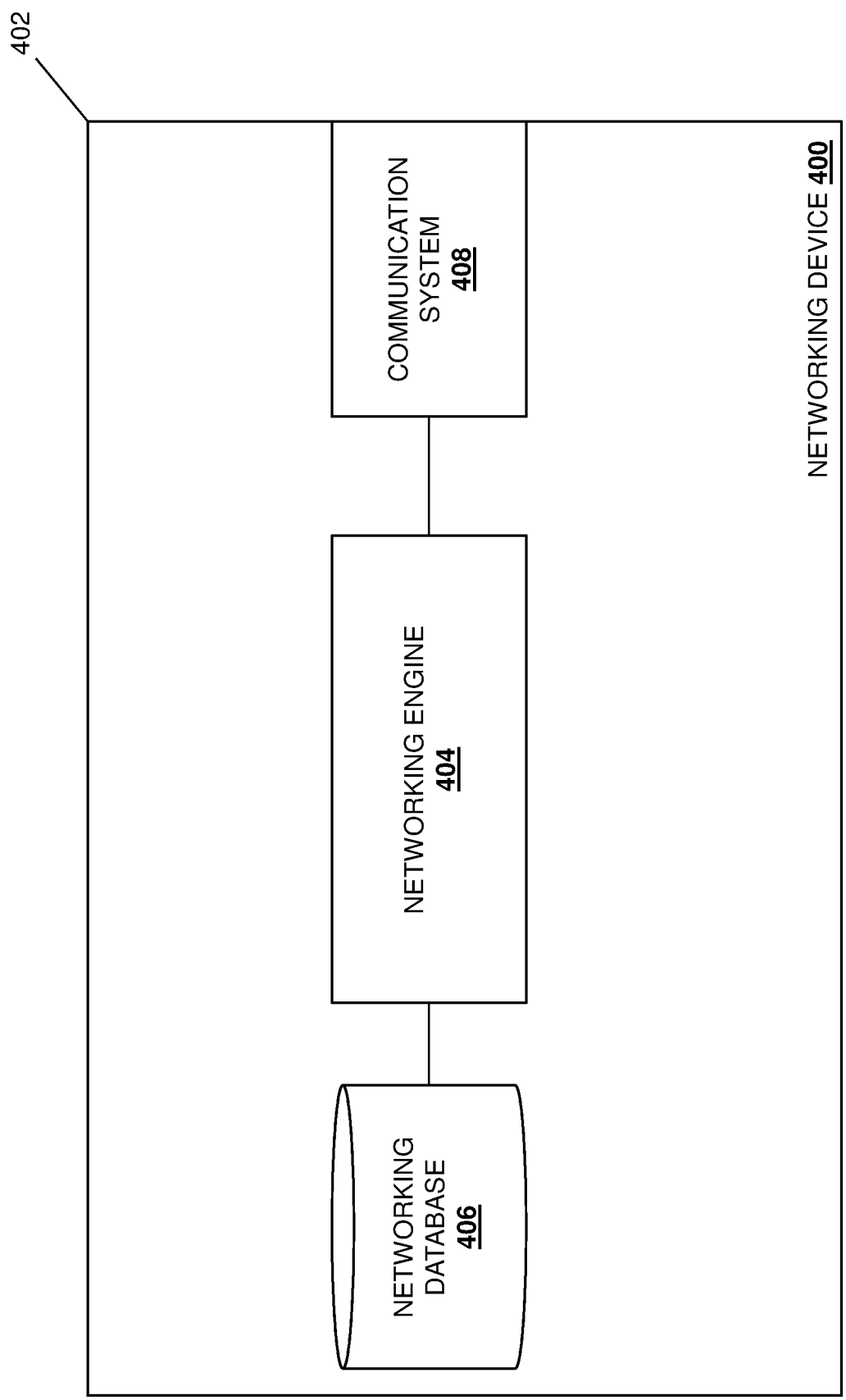
FIG. 4 is a schematic view illustrating an embodiment of a networking device that may be included in the chassis of FIG. 3 and that may replace other networking devices, or be replaced, via the automated networking device replacement system of the present disclosure.

Referring now to FIG. 4, an embodiment of a networking device 400 is illustrated that may provide any of the networking devices 302a-302c discussed above with reference to FIG. 3. As such, the networking device 300 may be provided by the IHS 100 discussed above with reference to FIG. 1 and/or may include some or all of the components of the IHS 100, and in the specific examples below are discussed as being provided by IOMs that may be configured to operate in a "full switch" role or in a "fabric switch" role. However, while illustrated and discussed as being provided by specific networking devices operating in specific roles, one of skill in the art in possession of the present disclosure will recognize that the functionality of the networking device 400 may be provided by other networking devices while remaining within the scope of the present disclosure as well. In the illustrated embodiment, the networking device 400 includes a chassis 402 that houses the components of the networking device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 404 that is configured to perform the functionality of the networking engines and/or networking devices discussed below.

The chassis 402 may also house a storage system (not illustrated, but which may include the storage 108 discussed above with reference to FIG. 1) that is coupled to the networking engine 404 (e.g., via a coupling between the storage system and the processing system) and that includes a networking database 406 that is configured to store any of the information utilized by the networking engine 404 discussed below. The chassis 402 may also house a communication system 408 that is coupled to the networking engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific networking device 400 has been illustrated, one of skill in the art in possession of the present disclosure will recognize that networking devices (or other devices operating according to the teachings of the present disclosure in a manner similar to that described below for the networking device 400) may include a variety of components and/or component configurations for providing conventional networking device functionality, as well as the functionality discussed below, while remaining within the scope of the present disclosure as well.

Figure 5:
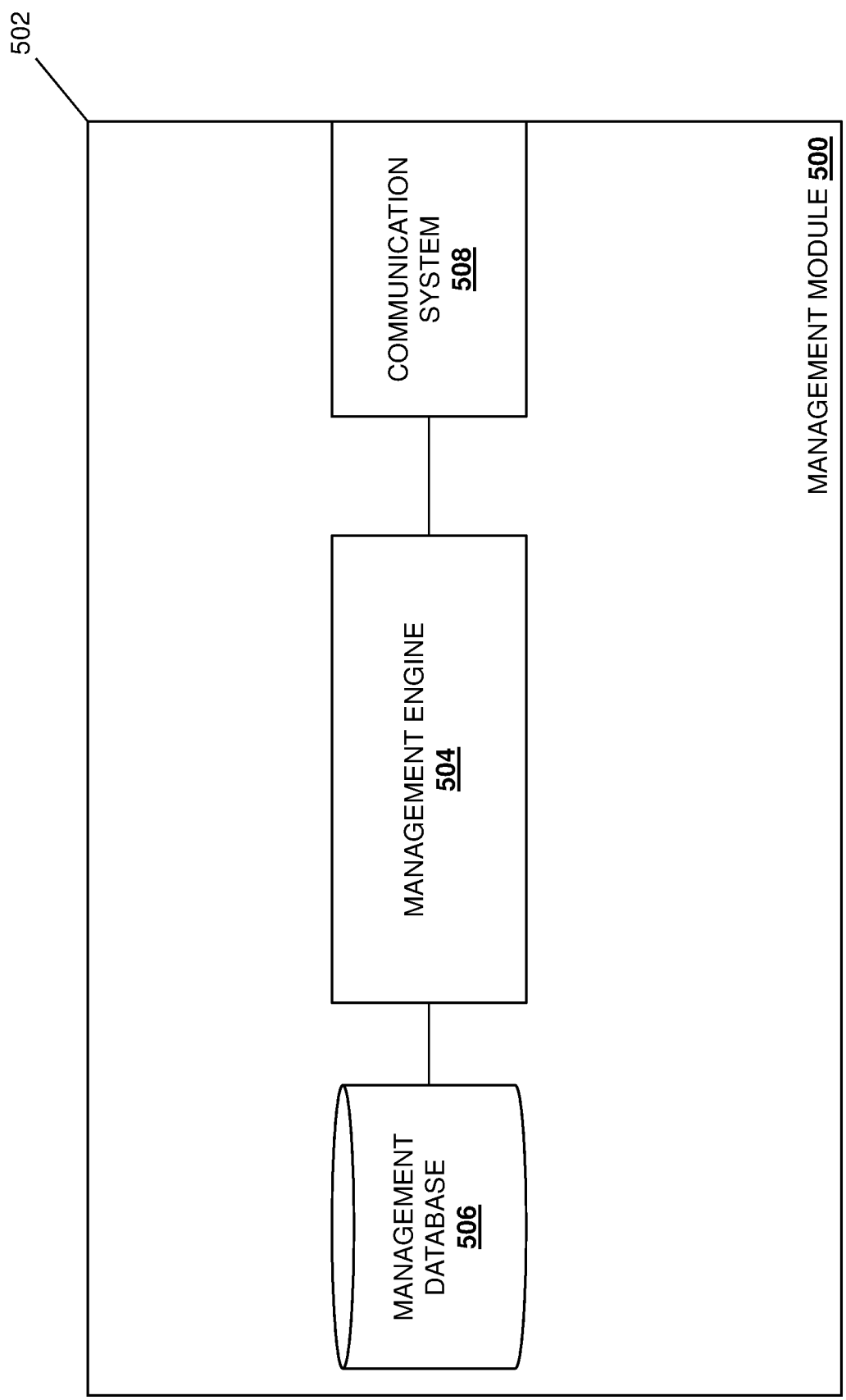
FIG. 5 is a schematic view illustrating an embodiment of a management module that may be included in the chassis of FIG. 3.

Referring now to FIG. 5, an embodiment of a management module 500 is illustrated that may provide the management module 304 discussed above with reference to FIG. 3. As such, the management module 500 may be provided by the IHS 100 discussed above with reference to FIG. 1 and/or may include some or all of the components of the IHS 100, and in specific examples is described below as being provided by an OME-M management module. Furthermore, while illustrated and discussed as a being provided by a specific management module, one of skill in the art in possession of the present disclosure will recognize that the functionality of the management module 500 discussed below may be provided by other management devices that are configured to operate similarly as the management module 500 discussed below. In the illustrated embodiment, the management module 500 includes a chassis 502 that houses the components of the management module 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management engine 504 that is configured to perform the functionality of the management engines and/or management modules discussed below.

The chassis 502 may also house a storage system (not illustrated, but which may include the storage 108 discussed above with reference to FIG. 1) that is coupled to the management engine 504 (e.g., via a coupling between the storage system and the processing system) and that includes a management database 506 that is configured to store any of the information utilized by the management engine 504 discussed below. The chassis 502 may also house a communication system 508 that is coupled to the management engine 504 (e.g., via a coupling between the communication system 508 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific management module 500 has been illustrated, one of skill in the art in possession of the present disclosure will recognize that management module (or other management devices operating according to the teachings of the present disclosure in a manner similar to that described below for the management module 500) may include a variety of components and/or component configurations for providing conventional management functionality, as well as the functionality discussed below, while remaining within the scope of the present disclosure as well.

Figure 6:
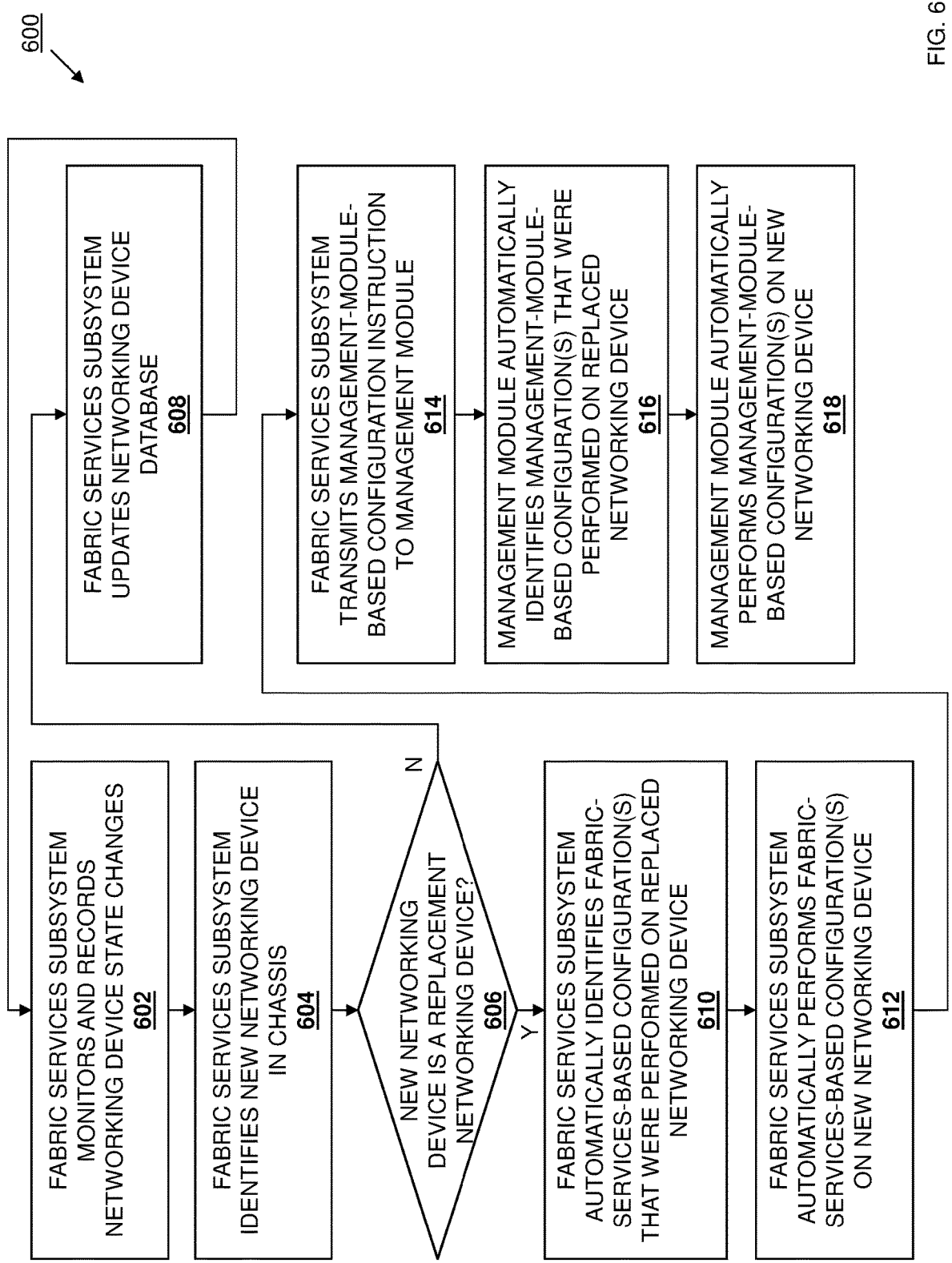
FIG. 6 is a flow chart illustrating an embodiment of a method for automated replacement of networking devices.

Referring now to FIG. 6, an embodiment of a method 600 for automated replacement of networking devices is illustrated. As discussed below, the systems and methods of the present disclosure provide, in the event of the unavailability of a second networking device in a chassis (a "replaced" networking device in the examples below), for the identification of a first networking device that has been provided in the chassis (e.g., a "replacement" networking device that has been positioned in the chassis and cabled to a networking fabric by a user in a similar manner as the replaced networking device), and the configuration of that replacement networking device without the need for manual intervention by the user. For example, the automated networking device replacement system of the present disclosure may include a chassis housing in which management module and a fabric services subsystem are provided. The fabric services subsystem identifies that a first networking device has been provided in the chassis, and determines that the first networking device is a replacement for a second networking device. In response, the fabric services subsystem automatically identifies at least one fabric-services-based configuration that was performed on the second networking device, and automatically performs the at least one fabric-services-based configuration on the first networking device. The fabric services subsystem then transmits a management-module-based configuration instruction to the management module that causes the management module to automatically perform at least one management-module-based configuration on the first networking device that was performed on the second networking device. As such, the systems and methods of the present disclosure provide a "zero-touch" networking device replacement workflow that may automate networking device configuration operations from multiple configuration sources based on, for example, the connectivity and role of the replaced/replacement networking devices.

Figure 7A:
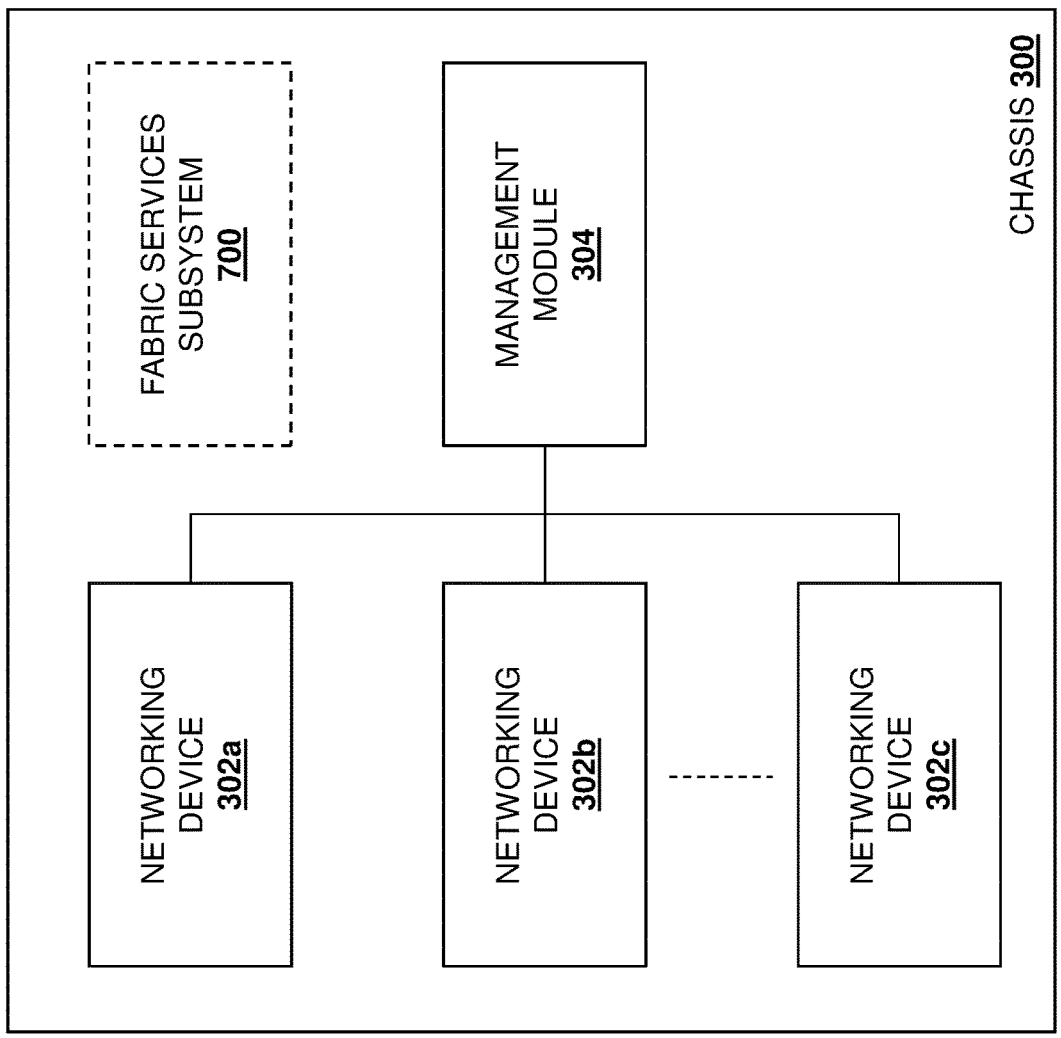
FIG. 7A is a schematic view illustrating an embodiment of the operation of the chassis of FIG. 3 during the method of FIG. 6.

The method 600 begins at block 602 where a fabric services subsystem monitors and records networking device state changes. With reference to FIG. 7A, in an embodiment of block 602, the networking engine(s) 404 in one or more of the networking devices 302a-302c/400 in the chassis 202a/300 may operate to provide a fabric services subsystem 700. For example, the networking engines 404 in the networking devices 302a-302c/400 in the chassis 202a/300 may be configured to perform a fabric services subsystem election/designation process to elect/designate one of the networking engines 404 in the networking devices 302a-302c/400 as a fabric services "master" and the others of the networking devices 302a-302c/400 as fabric services "slaves", and the networking engine 404 providing the fabric services master may then operate during the method 600 to provide the fabric services subsystem 700, with the networking engine 404 providing one of the fabric services slaves configured to take over fabric services master operations in the event of the unavailability of the fabric services master. Furthermore, while the fabric services subsystem 700 is described in some examples below as being provided by the networking engine 404 in the networking device 302a/400 in the chassis 202a/300 in which a networking device is replaced, one of skill in the art in possession of the present disclosure will appreciate that the fabric services subsystem 700 may be provided by the other networking devices 302b-302c/400 in the chassis 202a/300, or by a networking device 302a-302c/400 in a chassis 202b-202c/300 other than the chassis 202a/300 in which a networking device is replaced, while remaining within the scope of the present disclosure as well. In other words, at least some of the networking device replacement functionality described below may be provided for any chassis 202a-202c by a fabric services subsystem that is provided by a networking engine in networking device that is located in a different chassis.

In an embodiment, at block 602, the fabric services subsystem 700 may operate to monitor and record networking device state changes that occur in the networking devices 302a-302c/400 in the chassis 202a/300. As will be appreciated by one of skill in the art in possession of the present disclosure, each of the networking devices 302a-302c/400 may be provided in the chassis 202a/300, cabled together and to the network 204, configured to provide a networking fabric, and may then operate to provide that networking fabric. Furthermore, any of the networking devices 302a-302c/400 in the chassis 202a/300 may then subsequently be updated and/or otherwise reconfigured, and one of skill in the art in possession of the present disclosure will appreciate how the initial configuration, provisioning of the networking fabric, and/or subsequent re-configuration may generate networking device state changes in any of the networking devices 302a-302c/400 in the chassis 202a/300, and the networking engine 404 in the networking device 302a/400 in the chassis 202a/300 that is operating as the fabric services master to provide the fabric services subsystem 700 may identify those networking device state changes and store them in its networking database 406 at block 602.

In a specific example, the networking devices 302a-302c/400 in the chassis 202a/300 may be provided by Input-Output Modules (IOMs) that may be configured to operate in a "full switch" role ("full switch" IOMs) to perform a variety of switching operations known in the art on data received at that "full switch" IOM, or to operate in a "fabric switch" role ("fabric switch" IOMs) to perform a variety of "pass-through" operations with a peer "full switch" IOM that performs a variety of switching operations known in the art on data that is received from the "fabric extender" IOM. As such, "fabric switch" IOMs may be configured to connect the networking devices 302a-302c in their chassis to "full switch" IOMs (in their chassis or in a different chassis), and transmit data between those networking devices 302a-302c and that "full switch" IOM (e.g., via data "pass-through" operations) so that the "full switch" IOM may perform "full switch" operations to route that data through the network fabric. However, while specific IOM functionality is described herein for the networking devices 302a-302c, one of skill in the art in possession of the present disclosure will recognize that networking devices configured to perform other functionality will fall within the scope of the present disclosure as well.

As would be appreciated by one of skill in the art in possession of the present disclosure, multiple different configurations may be performed on such IOMs in order to allow those IOMs to provide a networking fabric, and any of those different configurations may be provided by a different "source of truth". For example, a network administrator or other user may utilize the management module 304/500 in the chassis 300 (e.g., an OME-M management module) to provide Internet Protocol (IP) addresses, usernames, passwords, and/or other configuration information directly via internal 120 communications between a management module and any of the IOMs/networking devices 302a-302c/400 in the chassis 202a/300, and the source of truth of that configuration information will be the management module 304/500.

In another example, a network administrator or other user may utilize an IOM Command Line Interface (CLI) to provide a Spanning Tree Protocol (STP) mode, global commands, and/or other configuration information directly on any of the IOMs/networking devices 302a-302c/400 in the chassis 202a/300, and the source of truth of that configuration information will be the IOM/networking device 302a-302c/400 in the chassis 202a/300 upon which that configuration information is provided. As will be appreciated by one of skill in the art in possession of the present disclosure, configuration information provided directly on IOMs/networking devices via an IOM CLI may provide a "running configuration" for that IOM/networking device, discussed in further detail below. In another example, a network administrator or other user may utilize the management module 304/500 in the chassis 300 (e.g., an OME-M management module) to provide an operating mode, server configuration, uplink configuration, and/or other configuration information associated with any of the IOMs/networking devices 302a-302c/400 in the chassis 202a/300 to the fabric services subsystem 700 provided in the chassis 202a/300 (e.g., via a fabric services subsystem Representational State Transfer (REST) Application Programming Interface (API)), and the source of truth of that configuration information will be the fabric services subsystem 700.

In another example, a network administrator or other user may utilize fabric services subsystem 700 provided in the chassis 202a/300 to provide a port channel identifier, a Virtual Local Area Network (VLAN) configuration, and/or other configuration information that is based on operational state/connectivity of an IOM/networking device 302a-302c/400 in the chassis 202a/300 directly on any of those IOMs/networking devices 302a-302c/400, and the source of truth of that configuration information will be the fabric services subsystem 700. However, while several specific example of configurations/configuration information and sources of truth for those configurations/configuration information have been provided, one of skill in the art in possession of the present disclosure will appreciate that a variety of configurations and/or configuration information may be provided for IOMs and/or other networking devices from a variety of sources while remaining within the scope of the present disclosure below.

As discussed above, at block 602, the fabric services subsystem 700 may operate to monitor and record networking device state changes that occur in the networking devices 302a-302c/400 in the chassis 202a/300 when any of the configurations/configuration information discussed above is provided for those networking devices 302a-302c/400. Continuing with the specific examples provided above, for the configuration information provided by a network administrator or other user utilizing the management module 304/500 in the chassis 300 (e.g., an OME-M management module) that is the source of truth of that configuration information, the management module 304/500 in the chassis 202a/300 may store a copy of any configuration information provided for any of the IOMs/networking devices 302a-302c/400 in the chassis 202a/300 in its management database 506. Furthermore, while management module 304/500 in the chassis 202a/300 is described as storing copies of configuration information provided for networking devices 302a-302c/400 in that chassis 202a/300, one of skill in the art in possession of the present disclosure will appreciate that a management module in a first chassis (e.g., the chassis 202a) may perform management operations for networking devices in a second chassis (e.g., the chassis 202b), and thus may store copies of configuration information provided for networking devices in that second chassis while remaining within the scope of the present disclosure as well.

Similarly, for the configuration information provided by a network administrator or other user utilizing an IOM CLI and directly on any of the IOMs/networking devices 302a-302c/400 in the chassis 202a/300 that are then the source of truth of that configuration information, the fabric services subsystem 700 in the chassis 220a/300 may operate to expose an API to provide for the transmission of any configuration information provided on an IOM via the IOM CLI, and the management module 304/500 in the chassis 300 (e.g., an OME-M management module) may then operate to query the fabric services subsystem 700 via the exposed API to cause that configuration information to be transmitted to the management module 304/500 in the chassis 300 (e.g., for storage in its management database 506). In a specific example, the configuration information transmitted to the management module 304/500 in the chassis 202a/300 via the API exposed by the fabric services subsystem 700 may cause each IOM to stream/copy its "running configuration" to a defined location in the management module 304/500, and thus management module 304/500 in the chassis 202a/300 may backup the running configurations of the IOMs (e.g., in its management database 506) in this manner. As will be appreciated by one of skill in the art in possession of the present disclosure, such running configuration backup operations by the management module 304/500 in the chassis 202a/300 may be performed on-demand, as a "cron job" (i.e., scheduled via a software utility cron), as an event-driven operation in an OME-M context, and/or in a variety of other manners that will fall within the scope of the present disclosure as well.

Similarly, for the configuration information provided by a network administrator or other user utilizing the management module 304/500 in the chassis 300 (e.g., an OME-M management module) and via the fabric services subsystem 700 in the chassis 202a/300 that provides the source of truth of that configuration information, the fabric services subsystem 700 may store that configuration in a "user-intent" database that may be provided by one or more networking databases 406 that are utilized by the networking engine 404 providing the fabric services subsystem 700 and that may be distributed across the networking devices 302a-302c/400 in the chassis 202a/400 (e.g., networking devices/IOMs that are included in a "cluster"). Similarly, for the configuration information provided by a network administrator or other user utilizing the fabric services subsystem 700 that is the source of truth of that configuration information, the fabric services subsystem 700 may store that configuration in a "fabric-services-intent" database that may be provided by one or more networking databases 406 that are utilized by the networking engine 404 providing the fabric services subsystem 700 and that may be distributed across the networking devices 302a-302c/400 in the chassis 202a/400 (e.g., networking devices/IOMs that are included in a "cluster"). However, while several specific example of configurations/configuration information storage performed in response to networking device state changes that result from networking device configurations have been provided, one of skill in the art in possession of the present disclosure will appreciate that networking device state changes may result in storage or preservation of other configuration information and/or other state change information while remaining within the scope of the present disclosure below.

Figure 7B:
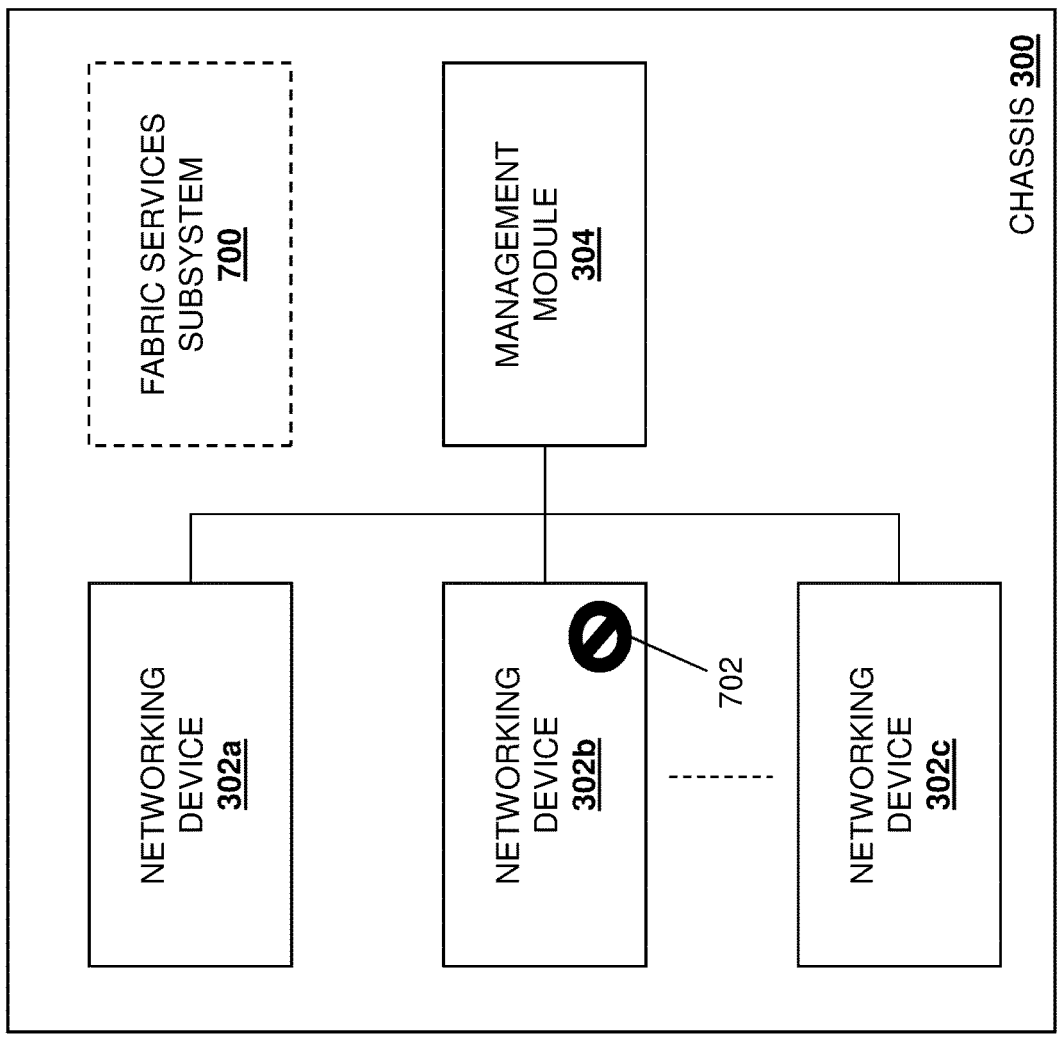
FIG. 7B is a schematic view illustrating an embodiment of the operation of the chassis of FIG. 3 during the method of FIG. 6.

For example, with reference FIG. 7B, the networking device 302b in the chassis 202a/300 may fail or otherwise become unavailable (as indicated by element 702 in FIG. 7B), and one of skill in the art in possession of the present disclosure will recognize how the unavailability of the networking device 302b in the chassis 202a/300 may be identified and recorded by the fabric services subsystem 700 as a networking device state change for that networking device 302b in its database (e.g., a networking database 406 utilized by the networking engine 404 providing the fabric services subsystem 700). In a specific example, the networking device state change caused by the unavailability of the networking device 302b in the chassis 202a/300 may be recorded by storing a chassis identifier for the chassis 202a/300 in which that unavailable networking device 302b is located, a networking device slot identifier for a networking device slot in the chassis 202a/300 in which that unavailable networking device 302b is located, and/or any other networking device information that one of skill in the art in possession of the present disclosure will recognize as identifying the location of the networking device 302b that became unavailable.

Figure 7C:
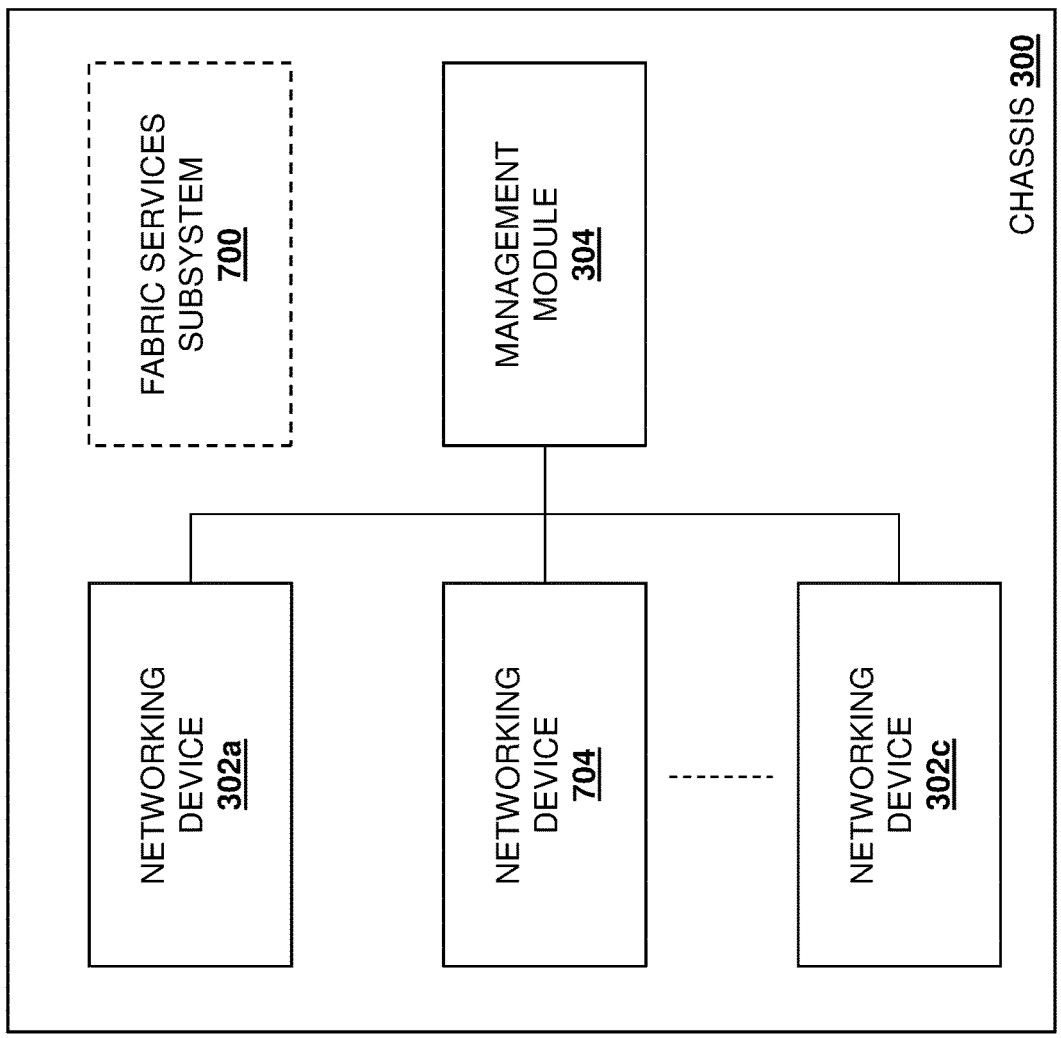
FIG. 7C is a schematic view illustrating an embodiment of the operation of the chassis of FIG. 3 during the method of FIG. 6.

The method 600 then proceeds to block 604 where the fabric services subsystem identifies a new networking device in a chassis. With reference to FIG. 7C, in an embodiment of block 604, a networking device 704 may be provided in the chassis 202a/300 to replace the networking device 302b that became unavailable in the chassis 202a/300. For example, in response to the failure of other unavailability of the networking device 302b in the chassis 202a/300, a network administrator or other user may de-cable the unavailable networking device 302b and remove it from the networking device slot in the chassis 202a/300 in which it is located, and the position the networking device 704 in that networking device slot in the chassis 202a/300 and cable that networking device 704 in a manner similar to the cabling that was provided for the unavailable networking device 302b. The networking device 704 may then be powered on or otherwise initialized such that it is detected and identified by the fabric service subsystem 700 in the chassis 202a/300. As will be appreciated by one of skill in the art in possession of the present disclosure, in some embodiments and following its initialization, the networking device 704 may remain "offline" for the purposes of providing a networking fabric (e.g., the networking device 704 may be performing reboot operations, may be experiencing network issues, may be isolated, etc.), and in such situations the fabric services subsystem 700 in the chassis 202a/300 may detect the networking device 704 and, due to its "offline" state, may record its presence in the networking device slot in the chassis 202a/300 (e.g., via a networking device slot identifier and chassis identifier in its networking database) and wait for the networking device 704 to come "online" for the purposes of providing a networking fabric in order to identify that networking device 704 at block 604.

The method 600 then proceeds to decision block 606 where it is determined whether the new networking device is a replacement networking device. In an embodiment, at decision block 606, the fabric services subsystem 704 may operate to determine whether the networking device 704 is a replacement networking device. For example, at decision block 606, the fabric services subsystem 700 may identify a chassis position of the networking device 704, and may then determine whether the networking device 704 is a replacement for the networking device 302b based at least partially on the chassis position of the networking device 704. In a specific example, at decision block 606 the fabric services subsystem 700 may compare a networking device slot identifier and chassis identifier that identify the chassis/networking device slot in which the networking device 704 was detected with a networking device slot identifier and chassis identifier that identify the chassis/networking device slot in which the unavailable networking device 302a was located, and determine whether the networking device 704 has been positioned in the same networking device slot in the chassis 202a/300 that previously housed the now-unavailable networking device 302a in order to determine whether the networking device 704 is a replacement networking device.

However, while a networking device is described as providing a replacement networking device via a determination of whether it is positioned in a chassis in the same location that an unavailable networking device was previously positioned, in other embodiments, the new networking device may be designated by a user as a replacement networking device without the need to position it in a chassis in the same location that an unavailable networking device was previously positioned. As such, a user may position the networking device 704 in a location in a chassis that is different than that of the networking device 302b that became unavailable, and at decision block 606 the fabric services subsystem 700 may determine whether the user has designated that networking device 704 as a replacement networking device.

In some embodiments, at decision block 606, the fabric services subsystem 700 may also validate any connections between the networking device 704 (e.g., provided via the cabling discussed above) and a networking fabric, and identify a configuration of the networking device 704 in that networking fabric, in order to identify a role of the networking device. As will be appreciated by one of skill in the art in possession of the present disclosure, the connections between the networking device 704 and the networking fabric (e.g., the connections of the networking device 704 to the networking devices in the chassis 202a/300 and/or in other chassis 202b-202c/300) provides a configuration of the networking device 704 in that networking fabric that allows the fabric services subsystem 700 to determine a role for that networking device 704 (e.g., the "full switch" role in which the networking device 704 is configured with the networking fabric to perform a variety of switching operations known in the art on data it receives, or the "fabric switch" role in which the networking device 704 is configured with the networking fabric to perform a variety of "pass-through" operations with a peer "full switch" networking device that performs a variety of switching operations known in the art on data that is received from the networking device 704).

In some embodiments of decision block 606, the fabric services subsystem 700 may request authorization from a network administrator or other user to treat the networking device 704 as a replacement networking device. For example, in response to identifying that the chassis position of the networking device 704 qualifies the networking device 704 as a replacement for the networking device 302b, or that a user has designated the networking device 704 as a replacement networking device, the fabric services subsystem 700 may instruct the management module 304/500 in the chassis 202a/300 to provide a replacement authorization request for display to a networking administrator or other user (e.g., via a display device), and may monitor to determine whether a replacement authorization is received from the network administrator or other user that authorizes treatment of the networking device 704 as a replacement networking device. However, rather than requiring user authorization to treat the networking device 704 as a replacement networking device, the authorization to treat the networking device 704 as a replacement networking device may be based on policy settings (e.g., a policy that provides for the treatment of the networking device 704 as a replacement networking device in the event it is identified in the same chassis position as an unavailable networking device, in the event it has been designated by a user as a replacement networking device, etc.).

If, at decision block 606, it is determined that the new networking device is not a replacement networking device, the method 600 proceeds to block 608 where the fabric services subsystem updates a networking device database. In some embodiments of decision block 606, the fabric services subsystem 700 may determine that the networking device 704 is not a replacement networking device due to the chassis position of the networking device 704 not matching the chassis position of the networking device 302b that became unavailable, due to the user not authorizing treatment of the networking device 704 as a replacement networking device (via the management module 304/500 in the chassis 202a/300), and/or due to other factors that would be apparent to one of skill in the art in possession of the present disclosure and, in response, the method 600 may proceed to block 608 where the fabric services subsystem 700 updates a networking database with information about the networking device 704 (e.g., by storing the networking device slot identifier and chassis identifier for the networking device slot/chassis 202a/300 in which the networking device 704 is located in its networking database 406). The method 600 then returns to block 602. As such, the method 600 may loop such that the fabric service subsystem monitors and records networking device state changes, identifies new networking devices, determines that those new networking devices are not replacement networking devices, and updates its networking device database as long as no replacement networking devices are provided in the chassis 202a/300.

If, at decision block 606, it is determined that the new networking device is a replacement networking device, the method 600 proceeds to block 610 where the fabric services subsystem automatically identifies fabric-services-based configuration(s) that were performed on a replaced networking device. In some embodiments of decision block 606, the fabric services subsystem 700 may determine that the networking device 704 is a replacement networking device due to the chassis position of the networking device 704 matching the chassis position of the networking device 302b that became unavailable, due to the user authorizing treatment of the networking device 704 as a replacement networking device (via the management module 304/500 in the chassis 202a/300), due to the user designating the networking device 704 as a replacement networking device, and/or due to other factors that would be apparent to one of skill in the art in possession of the present disclosure and, in response, the method 600 may proceed to block 610 where the fabric services subsystem identifies fabric-services based configuration(s) that were performed on the networking device 302a that became unavailable and was replaced by the networking device 704. In a specific example in which the fabric services subsystem 700 instructed the management module 304/500 in the chassis 202a/300 to provide a replacement authorization request for display to a networking administrator or other user, and the networking administrator or other user provided a replacement authorization to the management module 304/500 in the chassis 202a/300, at block 610 the management module 304/500 in the chassis 202a/300 may instruct the fabric services subsystem 700 to perform replacement networking device configuration operations.

In an embodiment, at block 610, the fabric services subsystem 700 may utilize the role identified for the networking device 704 in order to identify the fabric-services-based configuration(s) that were performed on the networking device 302a that became unavailable and is being replaced by the networking device 704. In a specific example, in situations in which a "full switch" role was identified for the networking device 704, at block 610 the fabric services subsystem 700 may identify fabric-services-based configuration(s) such as, for example, any configurations and/or configuration information described above that were performed from the management module 304/500 in the chassis 202a/300 to the fabric services subsystem 700. As will be appreciated by one of skill in the art in possession of the present disclosure, a "full switch" fabric-services-based configuration may have been configured by a user (e.g., the user may have created the fabric and designated networking devices with "full switch" roles and "fabric switch" roles).

In another example, in situations in which a "fabric switch" role was identified for the networking device 704, at block 610 the fabric services subsystem 700 may determine whether a software update is required for the networking device 704 and, if so, update the software on the networking device 704, and then identify fabric-services-based configuration(s) such as, for example, any configurations and/or configuration information described above that were performed from the management module 304/500 in the chassis 202a/300 to the fabric services subsystem 700, and any configurations or configuration information described above that are included in "user-intent" databases or "fabric-services-intent" databases in the fabric services subsystem 700. In an embodiment, the software update operations for the networking device 704 may include the fabric services subsystem 700 identifying first current software provided on the networking device 704, identifying second current software on a peer networking device that is connected to the networking device 704 and operating in a "full switch" role as discussed above, and determining whether the first current software and the second current software are compatible (e.g., are the same software, are the same version of software, etc.) In the event the first current software and the second current software are compatible, the fabric services subsystem 700 may then identify fabric-services-based configuration(s) as discussed above. In the event the first current software and the second current software are not compatible, the fabric services subsystem 700 may upgrade the first current software to the second current software before identifying fabric-services-based configuration(s) as discussed above.

The method 600 then proceeds to block 612 where the fabric services subsystem automatically performs the fabric-services-based configuration(s) on the new networking device. In an embodiment, at block 612, the fabric services subsystem 700 may "replay" or otherwise perform any of the fabric-services-based configuration(s) identified at block 610 on the networking device 704. For example, in situations in which a "full switch" role was identified for the networking device 704, at block 612 the fabric services subsystem 700 may "replay" the provisioning of an operating mode, server configuration, uplink configuration, and/or other configuration information discussed above as having been provided to the fabric services subsystem 700 via the management module 304/500 for the networking device 302b. In another example, in situations in which a "fabric switch" role was identified for the networking device 704, at block 612 the fabric services subsystem 700 may "replay" the provisioning of an operating mode, server configuration, uplink configuration, and/or other configuration information discussed above as having been provided to the fabric services subsystem 700 via the management module 304/500 for the networking device 302b, and may "replay" the provisioning of any configuration information stored in its "user-intent" databases or "fabric-services-intent" databases for the networking device 302b that became unavailable.

The method 600 then proceeds to block 614 where the fabric services subsystem transmits a management-module-based configuration instruction to a management module. In an embodiment, at block 614 and following the performance of the fabric-services-based configuration(s) at block 612, the fabric services subsystem 700 may transmit a management-module-based configuration instruction that operates to notify the management module 304/500 of the completion of the fabric-services-based configuration(s). As such, one of skill in the art in possession of the present disclosure will appreciate that the management-module-based configuration instruction transmitted by the fabric services subsystem 700 to the management module 304/500 may include any information that is configured to cause the management module 304/500 to identify and perform the management-module-based configuration(s) as discussed below.

The method 600 then proceeds to block 616 where the management module automatically identifies management-module-based configuration(s) that were performed on a replaced networking device. In an embodiment, at block 616, the management engine 504 in the management module 304/500 may identify management-module-based configuration(s) such as, for example, any configurations and/or configuration information described above that were performed utilizing the management module 304/500 in the chassis 300 (e.g., an OME-M management module) and directly on the networking device 302a in the chassis 202a/300, and a running configuration collected from the networking device 302a in the chassis 202a/300. In some embodiments, the identification of management-module-based configuration(s) at block 616 may include the management engine 504 in the management module 304/500 retrieving backed-up management-module-based configuration(s) that were provided on a replaced networking device.

The method 600 then proceeds to block 618 where the management module automatically performs the management-module-based configuration(s) on the new networking device. In an embodiment, at block 618, the management engine 504 in the management module 304/500 may "replay" or otherwise perform any of the management-module-based configuration(s) identified at block 616 on the networking device 704. For example, at block 618 management engine 504 in the management module 304/500 may "replay" the provisioning of Internet Protocol (IP) addresses, usernames, passwords, and/or other configuration information provided directly on the networking device 302a/400 in the chassis 202a/300 using the management module 304/500, and may provide the running configuration (which may have been streamed from the networking device 302b to a defined location in the management module 304/500 as discussed above) on the networking device 704. As will be appreciated by one of skill in the art in possession of the present disclosure, following the performance of the fabric-services-based configuration(s) and the management-module-based configuration(s), the networking device 704 and the networking fabric to which it is connected may be configured substantially the same as that networking fabric and the networking device 302b that became unavailable, and thus the networking fabric/networking device 704 may operate in substantially the same manner as the networking fabric with networking device 302b that became unavailable in order to allow the networking fabric (that previously included the networking device 302b) to resume its operation with the networking device 704.

Thus, systems and methods have been described that provide, in the event of the unavailability of a second IOM in a chassis (a "replaced" IOM in the examples below), for the identification of a first IOM that has been provided in the chassis (e.g., a "replacement" IOM that has been positioned in the chassis and cabled to a networking fabric by a user in a similar manner as the replaced IOM) and the configuration of that replacement IOM without the need for manual intervention by the user. For example, the automated IOM replacement system of the present disclosure may include a chassis housing in which management module and a fabric services subsystem are provided. The fabric services subsystem identifies that a first IOM has been provided in the chassis, and determines that the first IOM is a replacement for a second IOM. In response, the fabric services subsystem automatically identifies at least one fabric-services-based configuration that was performed on the second IOM, and automatically performs the at least one fabric-services-based configuration on the first IOM. The fabric services subsystem then transmits a management-module-based configuration instruction to the management module that causes the management module to automatically perform at least one management-module-based configuration on the first IOM that was performed on the second IOM. As such, the systems and methods of the present disclosure provide a "zero-touch" IOM replacement workflow that may automate IOM configuration operations from multiple configuration sources based on, for example, the connectivity and role of the replaced/replacement IOMs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated networking device replacement system, comprising:
 a chassis;
 a management module that is located in the chassis and that provides a first configuration source; and
 a fabric services subsystem that is provided in the chassis, that provides a second configuration source that is different than the first configuration source provided by the management module, and that is coupled to the management module, wherein the fabric services subsystem is configured to:
 identify that a first networking device has been provided in the chassis;
 determine that the first networking device is a replacement for a second networking device in a networking fabric;
 determine, in response to determining that the first networking device is a replacement for the second networking device in the networking fabric, one of a full switch role for the first networking device that configures the first networking device to perform switching operations on data, or a fabric switch role for the first networking device that configures the first networking device to perform pass-through operations with a peer networking device having the full switch role;
 automatically identify, based on the full switch role or the fabric switch role that was determined for the first networking device, at least one fabric-services-based configuration that was provided by the management module to the fabric services subsystem for provisioning on the second networking device and that was performed on the second networking device;
 automatically perform, in response to identifying the at least one fabric-services-based configuration, the at least one fabric-services-based configuration on the first networking device in order to configure the first networking device with an operating mode, a server configuration, and an uplink configuration that were configured on the second networking device; and
 transmit, in response to automatically performing the at least one fabric-services-based configuration on the first networking device, a management-module-based configuration instruction to the management module that is configured to cause the management module to automatically perform at least one management-module-based configuration on the first networking device that was performed on the second networking device in order to configure the first networking device with at least one Internet Protocol (IP) address and at least one username and password combination that were configured on the second networking device, wherein the networking fabric is configured to resume operation following the performance of the at least one fabric-services-based configuration and the at least one management-module-based configuration on the first networking device.

2. The system of claim 1, wherein the management module is configured to:
 automatically identify, in response to receiving the management-module-based configuration instruction, the at least one management-module-based configuration that was performed on the second networking device;

automatically perform, in response to identifying the at least one management-module-based configuration, the at least one management-module-based configuration on the first networking device.

3. The system of claim 1, wherein the fabric services subsystem is configured to:

identify a chassis position of the first networking device; and determine, at least partially based on the chassis position of the first networking device, that the first networking device is a replacement for the second networking device.

4. The system of claim 1, wherein the fabric services subsystem is configured to:

provide, in response to identifying that the first networking device has been provided in the chassis, a replacement authorization request;

receiving, in response to the replacement authorization request, a replacement authorization; and determine, at least partially based on the replacement authorization, that the first networking device is a replacement for the second networking device.

5. The system of claim 1, wherein the fabric services subsystem is configured to:

identify a networking fabric configuration of the first networking device in the networking fabric;

determine, based on the networking fabric configuration of the first networking device in the networking fabric, the fabric switch role for the first networking device; and automatically upgrade, based on the determining of the fabric switch role for the first networking device, first software on the first networking device.

6. The system of claim 5, wherein the fabric services subsystem is configured to:

identify, based on the determining of the fabric switch role for the first networking device, second software on a third networking device that has the full switch role and that provides the peer networking device to the first networking device, wherein the first software on the first networking device is upgraded to the second software.

7. The system of claim 1, wherein the automatically performing the at least one fabric-services-based configuration on the first networking device includes replaying the at least one fabric-services-based configuration that was performed on the second networking device.

8. An Information Handling System (IHS), comprising:

a processing system; and a memory system that is coupled to the processing system and that includes instructions that, when executed by the processing system, cause the processing system to provide a fabric services engine that provides a first configuration source and that is configured to:

identify that a first networking device has been provided in a chassis;

determine that the first networking device is a replacement for a second networking device in a networking fabric;

determine, in response to determining that the first networking device is a replacement for the second networking device in the networking fabric, one of a full switch role for the first networking device that configures the first networking device to perform switching operations on data, or a fabric switch role for the first networking device that configures the first networking device to perform pass-through operations with a peer networking device having the full switch role;

automatically identify, based on the full switch role or the fabric switch role that was determined for the first networking device, at least one fabric-services-based configuration that was provided by a management module to the fabric services engine for provisioning on the second networking device and that was performed on the second networking device;

automatically perform, in response to identifying the at least one fabric-services-based configuration, the at least one fabric-services-based configuration on the first networking device in order to configure the first networking device with an operating mode, a server configuration, and an uplink configuration that were configured on the second networking device; and transmit, in response to automatically performing the at least one fabric-services-based configuration on the first networking device, a management-module-based configuration instruction to the management module that provides a second configuration source that is different than the first configuration source provided by the fabric services engine, and that is configured to cause the management module to automatically perform at least one management-module-based configuration on the first networking device that was performed on the second networking device in order to configure the first networking device with at least one Internet Protocol (IP) address and at least one username and password combination that were configured on the second networking device, wherein the networking fabric is configured to resume operation following the performance of the at least one fabric-services-based configuration and the at least one management-module-based configuration on the first networking device.

9. The IHS of claim 8, wherein the fabric services engine is configured to:

identify a chassis position of the first networking device; and determine, at least partially based on the chassis position of the first networking device, that the first networking device is a replacement for the second networking device.

10. The IHS of claim 8, wherein the fabric services engine is configured to:

provide, in response to identifying that the first networking device has been provided in the chassis, a replacement authorization request;

receive, in response to the replacement authorization request, a replacement authorization; and determine, at least partially based on the replacement authorization, that the first networking device is a replacement for the second networking device.

11. The IHS of claim 8, wherein the fabric services engine is configured to:

identify a networking fabric configuration of the first networking device in the networking fabric;

determine, based on the networking fabric configuration of the first networking device in the networking fabric, the fabric switch role for the first networking device; and automatically upgrade, based on the determining of the fabric switch role for the first networking device, first software on the first networking device.

12. The IHS of claim 11, wherein the fabric services engine is configured to:

identify, based on determining of the fabric switch role for the first networking device, second software on a third networking device that has the full switch role and that provides the peer networking device to the first networking device, wherein the first software on the first networking device is upgraded to the second software.

13. The IHS of claim 8, wherein the automatically performing the at least one fabric-services-based configuration on the first networking device includes replaying the at least one fabric-services-based configuration that was performed on the second networking device.

14. A method for automated configuration of networking devices, comprising:
identifying, by a fabric services subsystem that provides a first configuration source, that a first networking device has been provided in a chassis;
determining, by the fabric services subsystem, that the first networking device is a replacement for a second networking device in a networking fabric;
determining, by the fabric services subsystem in response to determining that the first networking device is a replacement for the second networking device in the networking fabric, one of a full switch role for the first networking device that configures the first networking device to perform switching operations on data, or a fabric switch role for the first networking device that configures the first networking device to perform pass-through operations with a peer networking device having the full switch role;
automatically identifying, by the fabric services subsystem based on the full switch role or the fabric switch role that was determined for the first networking device, at least one fabric-services-based configuration that was provided by a management module to the fabric services subsystem for provisioning on the second networking device and that was performed on the second networking device;
automatically performing, by the fabric services subsystem in response to identifying the at least one fabric-services-based configuration, the at least one fabric-services-based configuration on the first networking device in order to configure the first networking device with an operating mode, a server configuration, and an uplink configuration that were configured on the second networking device; and
transmitting, by the fabric services subsystem in response to automatically performing the at least one fabric-services-based configuration on the first networking device, a management-module-based configuration instruction to the management module that provides a second configuration source that is different than the first configuration source provided by the fabric services subsystem, and that is configured to cause the management module to automatically perform at least one management-module-based configuration on the first networking device that was performed on the second networking device in order to configure the first networking device with at least one Internet Protocol (IP) address and at least one username and password combination that were configured on the second networking device, wherein the networking fabric is configured to resume operation following the performance of the at least one fabric-services-based configuration and the at least one management-module-based configuration on the first networking device.

15. The method of claim 14, further comprising:
automatically identifying, by the management module in response to receiving the management-module-based configuration instruction, the at least one management-module-based configuration that was performed on the second networking device;
automatically performing, by the management module in response to identifying the at least one management-module-based configuration, the at least one management-module-based configuration on the first networking device.

16. The method of claim 14, further comprising:
identifying, by the fabric services subsystem, a chassis position of the first networking device; and
determining, by the fabric services subsystem at least partially based on the chassis position of the first networking device, that the first networking device is a replacement for the second networking device.

17. The method of claim 14, further comprising:
providing, by the fabric services subsystem in response to identifying that the first networking device has been provided in the chassis, a replacement authorization request;
receiving, by the fabric services subsystem in response to the replacement authorization request, a replacement authorization; and
determining, by the fabric services subsystem at least partially based on the replacement authorization, that the first networking device is a replacement for the second networking device.

18. The method of claim 14, further comprising:
identifying, by the fabric services subsystem, a networking fabric configuration of the first networking device in the networking fabric;
determining, by the fabric services subsystem based on the networking fabric configuration of the first networking device in the networking fabric, the fabric switch role for the first networking device; and
automatically upgrading, by the fabric services subsystem based on the determining of the fabric switch role for the first networking device, first software on the first networking device.

19. The method of claim 18, further comprising:
identifying, by the fabric services subsystem based on the determining of the fabric switch role for the second networking device, second software on a third networking device that has the full switch role and that provides the peer networking device to the second networking device and that will provide a peer networking device to the first networking device, wherein the first software on the first networking device is upgraded to the second software.

20. The method of claim 14, wherein the automatically performing the at least one fabric-services-based configuration on the first networking device includes replaying the at least one fabric-services-based configuration that was performed on the second networking device.

\* \* \* \* \*